US012628030B2

(12) United States Patent
Srivastava et al.

(10) Patent No.: US 12,628,030 B2
(45) Date of Patent: May 12, 2026

(54) TECHNOLOGIES FOR NETWORK PATH AND TOPOLOGY MANAGEMENT

(71) Applicant: Intel Corporation, Santa Clara, CA (US)

(72) Inventors: Amar Srivastava, Bangalore (IN); Kshitij A. Doshi, Tempe, AZ (US); Cristian Florin Dumitrescu, Shannon (IE); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/561,225

(22) Filed: Dec. 23, 2021

(65) Prior Publication Data

US 2022/0124548 A1 Apr. 21, 2022

(51) Int. Cl.
| *H04W 28/02* | (2009.01) |
| *H04L 5/14* | (2006.01) |
| *H04W 28/10* | (2009.01) |
| *H04W 40/24* | (2009.01) |
| *H04W 88/16* | (2009.01) |

(52) U.S. Cl.
CPC ........... *H04W 28/0268* (2013.01); *H04L 5/14* (2013.01); *H04W 28/10* (2013.01); *H04W 40/248* (2013.01); *H04W 88/16* (2013.01)

(58) Field of Classification Search
None
See application file for complete search history.

(56) References Cited

U.S. PATENT DOCUMENTS

| 2017/0048792 A1* | 2/2017 | Sachs .................. H04W 72/542 |
| 2018/0092017 A1 | 3/2018 | Freda et al. |
| 2019/0042502 A1 | 2/2019 | Ryu |
| 2019/0364437 A1 | 11/2019 | Kamei et al. |

OTHER PUBLICATIONS

Partial European Search Report mailed Apr. 14, 2023 for European Patent Application No. 22203719.4, 19 pages.

(Continued)

*Primary Examiner* — Willie J Daniel, Jr.
(74) *Attorney, Agent, or Firm* — Essential Patents Group, LLP; Christopher K. Gagne

(57) ABSTRACT

The present disclosure relates to techniques for determining optimal routing paths for computing devices in a network, including selecting an optimal gateway among a number of available gateways. The techniques include gathering data regarding characteristics of a network, including gateways and network access nodes (NANs) in at least one access network. The characteristics can include, e.g., supported frequency bands, communication protocols, signal-to-noise ratio, power, signal noise and quality, slicing information, and whether a network vender is a standalone network vendor or a non-standalone network vendor. In one aspect, the characteristics are obtained using the Mobile Broadband Interface Model (MBIM). The characteristics can be used by devices in determining routing paths based on requirements of individual flows and/or workflows of individual application instances.

14 Claims, 6 Drawing Sheets

(56) References Cited

OTHER PUBLICATIONS

Patrik Olesen et al., "Universal Serial Bus MultiFlow Extension for Mobile Broadband Interface Model", Jul. 23, 2017, 28 pages, Revision 1.0.

Bjorn Boden et al., "Universal Serial Bus Communications Class Subclass Specification for Mobile Broadband Interface Model", May 1, 2013, 231 pages, Revision 1.0, Errata-1.

European Search Report mailed Jul. 17, 2023 for European Patent Application No. 22203719.4, 18 pages.

Office Action from European Patent Application No. 22203719.4 notified Jun. 18, 2025, 13 pgs.

* cited by examiner

Figure 4:
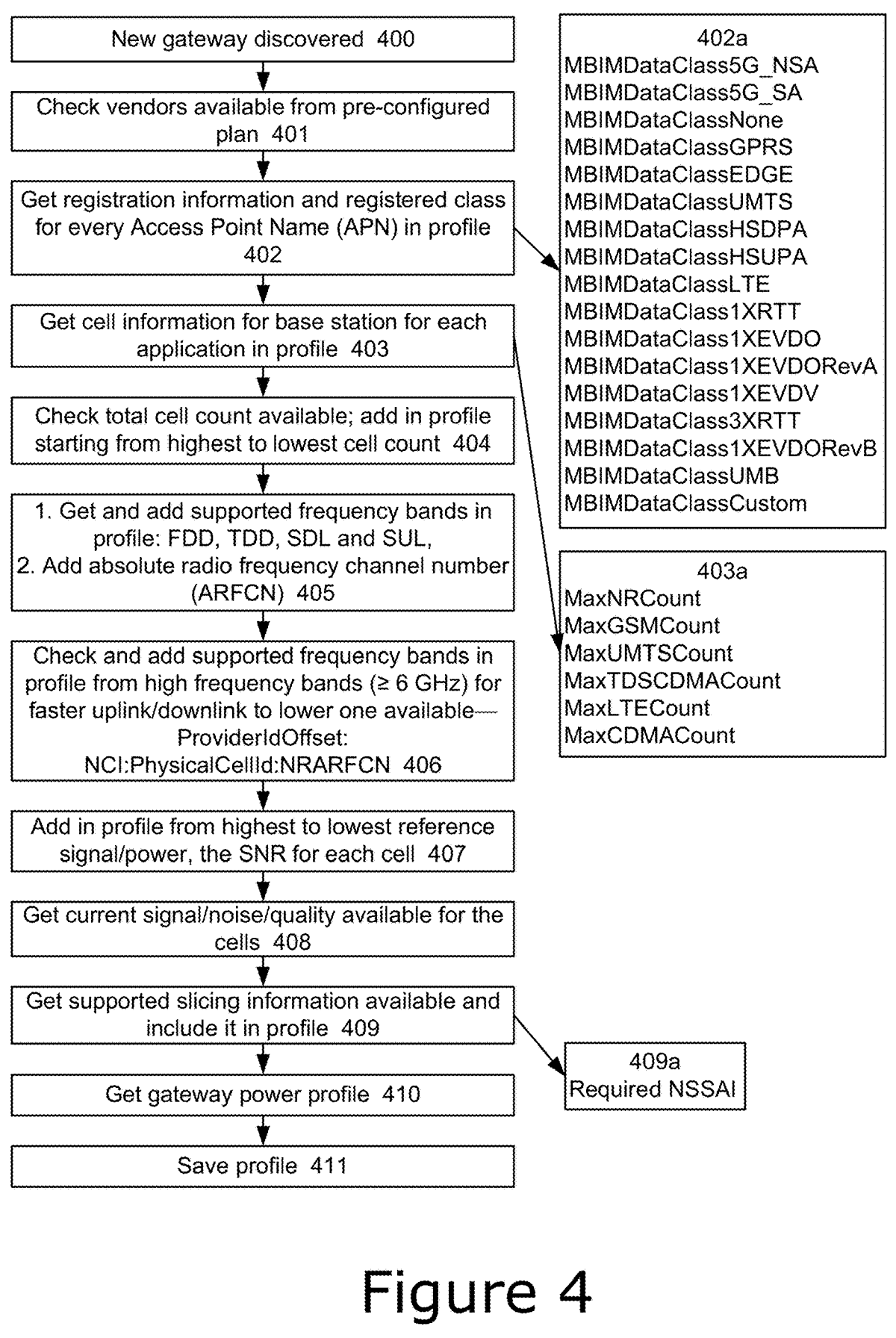

New gateway discovered  400

Check vendors available from pre-configured plan  401

Get registration information and registered class for every Access Point Name (APN) in profile  402

Get cell information for base station for each application in profile  403

Check total cell count available; add in profile starting from highest to lowest cell count  404

1. Get and add supported frequency bands in profile: FDD, TDD, SDL and SUL,
2. Add absolute radio frequency channel number (ARFCN)  405

Check and add supported frequency bands in profile from high frequency bands (≥ 6 GHz) for faster uplink/downlink to lower one available—ProviderIdOffset:
NCI:PhysicalCellId:NRARFCN  406

Add in profile from highest to lowest reference signal/power, the SNR for each cell  407

Get current signal/noise/quality available for the cells  408

Get supported slicing information available and include it in profile  409

Get gateway power profile  410

Save profile  411

402a
MBIMDataClass5G_NSA
MBIMDataClass5G_SA
MBIMDataClassNone
MBIMDataClassGPRS
MBIMDataClassEDGE
MBIMDataClassUMTS
MBIMDataClassHSDPA
MBIMDataClassHSUPA
MBIMDataClassLTE
MBIMDataClass1XRTT
MBIMDataClass1XEVDO
MBIMDataClass1XEVDORevA
MBIMDataClass1XEVDV
MBIMDataClass3XRTT
MBIMDataClass1XEVDORevB
MBIMDataClassUMB
MBIMDataClassCustom 403a
MaxNRCount
MaxGSMCount
MaxUMTSCount
MaxTDSCDMACount
MaxLTECount
MaxCDMACount 409a
Required NSSAI

756 processor 752 instructions
781 trusted execution
environment 790

760 memory 754 instructions
782 storage 758 instructions
783 output circuitry
784 input circuitry
786 acceleration
circuitry 764

766

766y

766x

766z network
interface 768 external
interface 770 battery 776 battery
monitor /
charger 778 edge devices
762 edge cloud
763 sensors 772 actuators 774 pos 775 power block
780

800

SDP 805

860

810

PP(s) 800

860

TECHNOLOGIES FOR NETWORK PATH AND TOPOLOGY MANAGEMENT

TECHNICAL FIELD

The present disclosure is generally related to edge computing, cloud computing, network communication, data centers, network topologies, traffic steering and/or shaping techniques, and communication system implementations, and in particular, to techniques for dynamically routing flows along various network paths in a network.

BACKGROUND

The number and variety of edge devices and Internet of Things (IoT) devices, and their application usages, have increased significantly in the last decade. These devices and their associated networks interact with one another in a wide variety of ways, and may be used in many different modes of operation. One example is Factory 4.0, in which manufacturers are integrating/enabling technologies including IoT devices such as sensors and actuators, cloud computing and analytics. Under these initiatives, a large factory may include thousands of connected devices. However, various challenges are presented by this technology.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 4 depicts a flowchart of an example implementation of the process of FIG. 2 according to various embodiments.

FIG. 6 illustrates an example edge computing environment.

FIG. 7 depicts example components of a compute node.

FIG. 8 illustrates an example software distribution platform.

DETAILED DESCRIPTION

Figure 1:
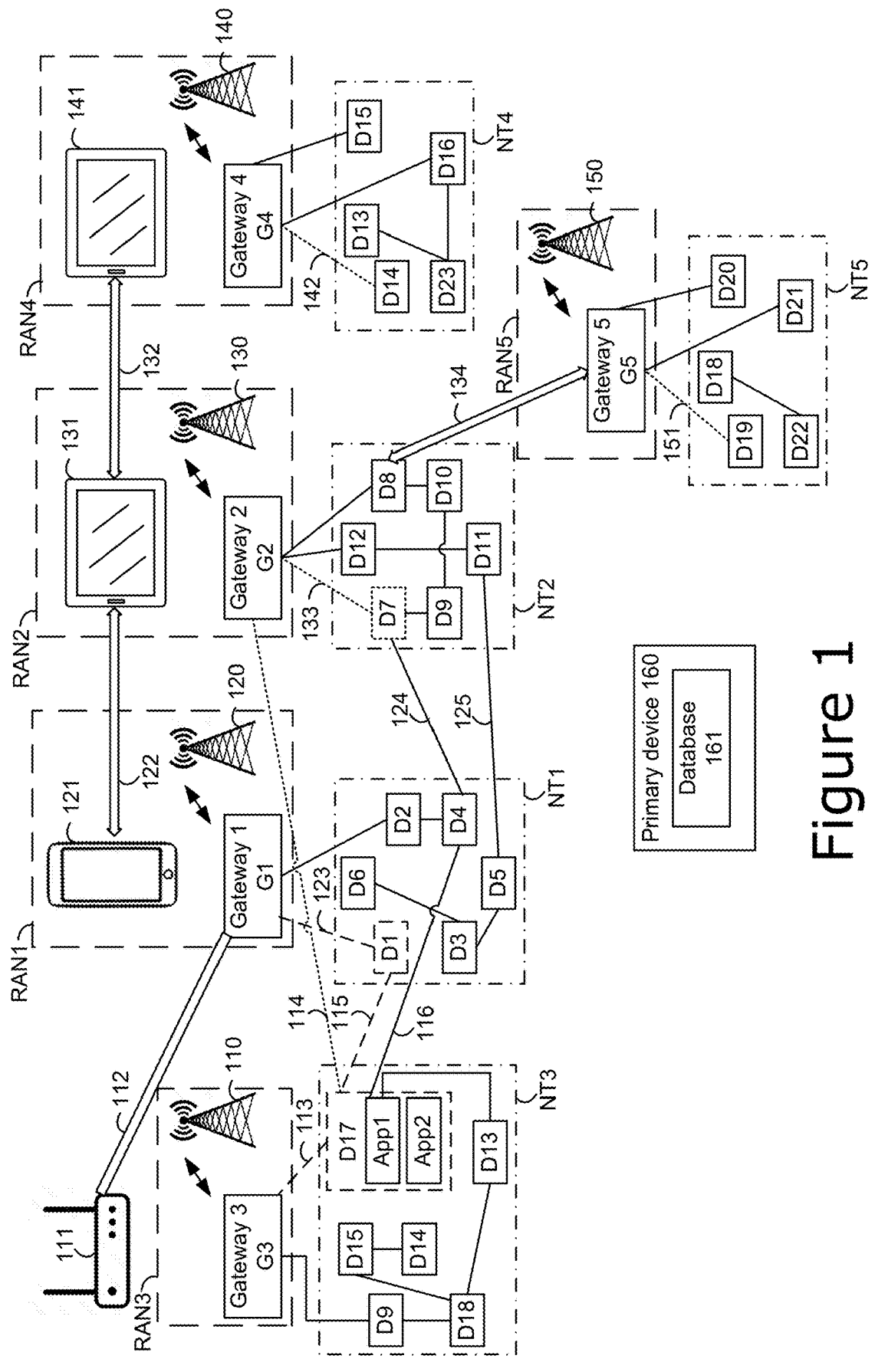
FIG. 1 depicts an example arrangement of devices and gateways in networks according to various embodiments.

The following embodiments generally relate to techniques for determining optimal routing paths for computing devices in a network, including selecting an optimal gateway among a number of available gateways.

As mentioned, the deployment of computer devices such as IoT devices in factories or other settings presents various challenges. For example, consider a factory extending over 100,000 square meters. While 4G networks can support a maximum of 100,000 devices per km$^2$, 5G networks will connect up to a million devices per km$^2$, or one device per square meter. This translates to a need to connect up to 100,000 devices, permitting companies to connect every sensor, actuator, or other types of devices in a factory.

Given the possible range of operation, it is desirable to bring a degree of prescriptive or opinionated management over how they are configured, deployed, and optimized. Generally, it is imperative to connect the various heterogeneous devices using well-defined interfaces and reliable communication means. To achieve this, the devices must be correctly configured and the operations scaled.

These edge and IoT devices are typically inexpensive, single purpose and simple devices that are manually selected and configured, and connected, using a variety of protocols, to each other and to a cloud/network for external connectivity. It is not realistic to expect these numerous simple devices to perform complex decisions in case of network failures. Worst case scenarios can result quickly if a critical operation signal either goes undelivered or is not received in a timely manner. Some examples include the catastrophic life or safety threats when communications do not transpire in a deterministic manner to/from medical cardiac devices such as pacemakers or when time-coordinated signals do not get delivered to defibrillators.

In additional to the example of a factory, the device can be deployed in other settings such as a home or vehicle. For example, a representative home edge/IoT network includes a personal subnetwork connecting devices such smart phones, smart watches, laptops, health or activity sensors, etc. A typical car subnetwork links Lidar, Sensors, gyroscopes, acceleration sensors, smart phones and/or other devices as applicable. When edge/IoT devices that belong to a particular subnetwork interact with other subnetworks and/or other external subnetworks, important concerns relating to finding best routing paths are raised. These include, for example, managing topology, minimizing energy, maximizing connectivity, achieving high operational efficiency, and so on. As connected devices are growing at a massive rate, different applications running inside devices may have different requirements (latency, throughput, energy, packet error budget etc.). In fact, a single application can have different types of flows and/or workloads, which need to be routed through a network efficiently in terms of resource consumption, delivery time, and/or the like. Accordingly, there is a need for a protocol to choose a best, efficient route and gateway for workloads to provide a seamless user experience.

Protocols and methods such as the Gossip Protocol, proactive, reactive, hybrid, etc., are based on the type of device/application and its requirements, e.g., latency sensitive, bandwidth sensitive, etc. However, although gateways or paths are assigned for devices or applications based on device traffic requirements/characteristics, multiple applications running on a device can act differently at times and can have different requirements such as different bit-rate requirements, quality of service (QoS) requirements, and/or the like. For example, an application may require a guaranteed bit rate (GBR) flow for critical/emergency situations, sending data at higher rates, and may require a non-GBR for other, non-sensitive operations. Thus, it may not always be efficient to statically associate a path and a gateway with a device or a particular application instance. This approach does not dynamically provide the best or optimal routing path and gateways according to changing network conditions and/or changing workloads in a single application or multiple applications running on a device at a particular time. Moreover, these approaches may send non-critical data on priority channels, causing congestion on high priority, high latency channels, resulting in the user paying more for the required services.

Further, as gateways are connected to different networks (e.g., private 5G, enterprise networks, public networks with different vendors, particular sliced networks, etc.) it is possible that at any particular time, network conditions of any gateway may deteriorate for various reasons (e.g., workload/increase, signal strength issue, etc.) and it may not be able to complete the workload requirements for critical data (e.g., requiring low latency and packet error rate). Devices in this case send data to a network without acknowledging or discovering dynamically changing network conditions, resulting in inefficiencies.

Moreover, as a gateway has pre-defined metering capabilities it's quite possible that sensitive/priority data will get dropped by metering logic, even though a device is sending high priority data through a gateway properly.

Finally, slicing is becoming popular in networks to address workload, but current routing protocols on the device side are usually not aware of it and do not use it for routing dynamically. Network slicing is a network architecture that enables the multiplexing of virtualized and independent logical networks on the same physical network infrastructure.

The techniques herein address the above and other issues. Various implementations discussed herein include gathering data regarding characteristics of a network, including gateways and network access nodes (NANs) in at least one radio access network (RAN). The NAN and/or RAN characteristics can include, e.g., supported frequency bands, communication protocols, signal-to-noise ratio, power, signal noise and quality, and network slicing information. The NAN and/or RAN characteristics can further indicate whether a network (or network vendor) is a standalone (SA) network (or SA network vendor) or a non-SA network (or non-SA network vendor). An SA network may be a network that can only be accessed by authorized users, and may include enterprise networks or privately maintained networks. In one aspect, the characteristics comprise parameters according to a Mobile Broadband Interface Model (MBIM) provided by the USB Implementers Forum (USB-IF). These parameters are defined by 3GPP specifications and referred to in the MBIM specification. The MBIM is a protocol by which USB hosts and mobile broadband devices can efficiently exchange control commands and data frames, and is designed for use with high speed mobile broadband modem devices (see e.g., "Universal Serial Bus Communications Class Subclass Specification for Mobile Broadband Interface Model", USB Implementers Forum, Inc., Revision 1.0, Errata-1 (1 May 2013), "Universal Serial Bus MultiFlow Extension for Mobile Broadband Interface Model", USB Implementers Forum, Inc., Revision 1.0 (23 Jul. 2017), MBIM Extensions Release number 2.0 and MBIM Extensions Release number 3.0, the contents of each of which are hereby incorporated by reference in their entireties). The characteristics can be stored in a remote or local database, for example, for use by devices in determining routing paths in the network.

For example, an application comprising multiple flows/workloads may run on a device. The device can determine requirements of each flow, access the database, and select a gateway to access the at least one RAN based on a comparison of the characteristics to the one or more respective requirements of the flow. These comparisons seeks to find a best match or alignment between the characteristics and the requirements for individual flows. The best or optimal match or alignment is used for traffic shaping, traffic steering, and/or traffic splitting purposes.

These and other advantages will be apparent in view of the following discussion.

FIG. 1 depicts an example arrangement of devices and gateways in networks according to various embodiments. Different type of interconnected networks are depicted, including IoT networks NT1-NT5, a private 5G network RAN4 (with a shared RAN with a public land mobile network (PLMN)), a time-sensitive private network for Factory 4.0 RAN5, as well as several gateways G1-G5 and various devices D1-D23 that are in their respective domains. Here, any device can communicate with any gateway G1-G5 or other devices either directly or via other devices.

As examples, the networks NT1-NT5 can be IoT networks, edge clouds, fogs, or some other network arrangement or combinations thereof. Networks NT1-NT5 may also be considered to be subnetworks of an overall network. Each network has an associated gateway, e.g., G1-G5, and each gateway is in an associated RAN, e.g., RAN1-RAN5, respectively. Although not shown in this example, one or more of the gateways could be associated with more than one RAN, which may implement one or more Radio Access Technologies (RATs). The gateways G1-G5 are components in the network which connect the devices D1-D23 to other devices in remote or non-local subnetworks, and/or connect the devices D1-D23 to the cloud via a network (e.g., a cellular network). In one implementation, the gateways G1-G5 comprise cellular modems. Additionally or alternatively, the gateways G1-G5 include multiple RAT interfaces such as, for example, a cellular modem, a WLAN modem, a Bluetooth® module, etc. Any of the devices or gateways of FIG. 1 may be the same or similar as the computing node 750 of FIG. 7 (discussed infra).

Each (sub)network includes various devices D1-D23. Connections in the system are denoted by a solid line for various protocols such as cellular (e.g., 3GPP 5G/NR, LTE, WiMAX, etc.), ZigBee, Bluetooth, Controller Area Network (CAN), Local Interconnect Network (LIN), Wireless Local Area Network (WLAN) (e.g., Wi-Fi, etc.), Constrained Application Protocol (CoAP), wired (e.g., Ethernet, etc.), and/or some other access technology such as any of those discussed herein. An example of a CAN is a network in an automobile. LIN is a serial network communication protocol used between components in vehicles.

Connections with a short-dashed line denote a non-GBR connection. Connections with a long-dashed line denote a GBR connection. Connections with a wide double arrow denote a non-3GPP connectivity, where 3GPP refers to the 3rd Generation Partnership Project. This includes standards organizations which develop protocols for mobile telecommunications including Global System for Mobile Communications (GSM) and related 2G and 2.5G standards, Universal Mobile Telecommunications System (UMTS) and related 3G standards, Long-Term Evolution (LTE) and related 4G standards, and 5G New Radio (NR) and related 5G standards. Non-3GPP technologies include Worldwide Interoperability for Microwave Access (WiMAX), CDMA2000 (Code Division Multiple Access), WLAN, fixed/wired networks, and/or any other suitable communication protocol/standard such as those discussed herein.

The connection 112 with a wide line without arrows denote a wired path such as an Ethernet cable. The devices can communicate with other devices in the same network and in another network.

Specifically, NT3 includes devices D9, D13-D15, D17 and D18. D17 runs applications App1 and App2, for example. An associated or default gateway G3 of the network communicates in RAN3, which includes a cell tower/base station 110. A NAN 111 (e.g., a router or other network element) may be associated with the RAN, but is connected by a wired path 112 to gateway G2. In each of the networks NT1-NT5, the devices D1-D23 are connected to one another by paths as indicated, where the path 113 represents a GBR connection between D17 and G3, a path 114 represents a non-GBR connection between D17 and G2, a path 115 represents a GBR connection between D17 and D1, and a path 116 represents a connection between App1 of D17 and D4.

In this example, G3 has E-SIM technology and hosts multiple Access Point Names (APNs) and bearers including GBR, non-GBR and delay-critical GBR bearers. An APN is the name of a gateway between a mobile network and another computer network, such as the public Internet. E-SIM technology refers to a reprogrammable SIM embedded in a gateway to provide built-in, stand-alone cellular connectivity. The E-SIM allows the gateway to compare cellular networks and select a desired service. A bearer is a communication pipe, tunnel, or data service that carries a data stream or flow(s) between two or more devices. For purposes of the present disclosure, a "bearer" may refer to any such pipe, tunnel, or data service provided by any type of network or RAT. A gateway and/or any other device depicted by FIG. 1 can have multiple bearers and can sometimes create a new bearer. A bearer can connect to any frequency or channel of a cell phone tower/base station at the hardware level.

NT1 includes devices D1-D6. The associated or default gateway G1 of the network communicates in RAN1, which includes a NAN 120, which in this example is a cellular tower/base station. UE 121 may be associated with the RAN1 and communicates using non-3GPP connectivity path 122 with a tablet 131. The dashed line path 123 represents a GBR connection between D1 and G1. In this example, G1 hosts two bearers, namely GBR and non-GBR bearers. D4 communicates with D7 over a path 124, and D5 communicates with D11 over a path 125.

NT2 includes devices D7-D12. The associated or default gateway G2 of the network communicates in RAN2, which includes a cell tower/base station 130. The tablet 131 may be associated with the RAN and communicates using non-3GPP connectivity on a path 132 with another tablet 141. The path 133 represents a non-GBR connection between D7 and G2. The path 134 represents a non-3GPP connection between D8 and G5. In this example, G2 hosts multiple bearers.

NT4 includes devices D13-D16 and D23. The associated or default gateway G4 of the network communicates in RAN4, which includes a cell tower/base station 140. The path 142 represents a non-GBR connection between D14 and G4. In this example, G4 is in a private 5G network with shared RAN with a PLMN network.

NT5 includes devices D18-D22. The associated or default gateway G5 of the network communicates in RAN5, which includes a cell tower/base station 150. The path 151 represents a non-GBR connection between D19 and G5. In this example, G5 is in a Factory 4.0 private 5G time-sensitive network such as those discussed in Institute of Electrical and Electronics Engineers (IEEE) "Standard for a Precision Clock Synchronization Protocol for Networked Measurement and Control Systems", IEEE Std 1588-2019 (16 Jun. 2020) ("[IEEE1588]") and "IEEE Standard for Local and Metropolitan Area Ntworks—Timing and Synchronization for Time-Sensitive Applications," IEEE Std 802.1AS™-

2020 (19 Jun. 2020) ("[IEEE802.1AS]"), the contents of each of which are hereby incorporated by reference in its entireties.

The system further includes a primary device 160 and a database 161.

As a specific example, consider device D17. It is a device on which multiple applications (e.g., App1, App2 . . . ) are running, where each application can have multiple flows/workloads with their own respective requirements. A flow/workload can be a method, process or other task, for example.

In a setup or exploration phase, the primary device 160 detects characteristics of the gateways, including their capabilities, and stores those capabilities in gateway profiles in the database 161. The database 161 need not be stored at the primary device 160 but can be distributed to other locations in the system. In one example, each of the devices D1-D23 can have their own local version of the database 161 that they individually access when attempting to dynamically adjust a flow path. Here, the characteristics stored in a local database 161 at a first device may be different than those included in a local database 161 at a second device. Additionally or alternatively, the devices may obtain gateway profiles and/or characteristics from the database 161, store those profiles/characteristics locally (e.g., using a suitable caching system), and later obtain new or updated profiles/characteristics for dynamic traffic steering or traffic splitting. Additionally or alternatively, the functions of the primary device 160 could be incorporated into one or more of the devices D1-D23 in the networks.

The gateway profiles can be used by devices such as D17 to select a gateway that is a best match to one or more requirements of D17. For example, the requirements can be expressed in terms of a service level agreement (SLA) of the device. The SLA can encompass factors such as availability, jitter, latency, and/or other reliability metrics such as those discussed herein. For example, D17 may ordinarily request the default gateway of NT3, G3, to create one more bearers for GBR at some time. However, if at a given time, the profile indicates G3 is already at saturation point for GBR flows and therefore cannot accept anymore GBR flows, D17 can explore and find another path for its GBR needs. It may, for example, select to route flows via D1 and Gateway 1, on paths 115 and 123. For a non-GBR flow, D17 may connect to G2 via path 114. Here, App1 generates a GBR flow while App2 may generate both GBR and non-GBR flows. D17 and D1 are depicted by dashed line boxes since they are GBR devices for at least some of their applications or application flows.

A converse situation may exist for a device such as D7 in NT2. D7 is depicted by a dotted line box since it is a non-GBR device. D7 can have its own non-GBR flow fulfilled by G2, so it can choose any path for its flows by considering other parameters in the gateway profiles that are better aligned to its needs at a given time in terms of characteristics such as cost (e.g., in terms of resource usage or the like), power usage, and packet loss statistics.

Usually, the devices are attached to a particular path or gateway based on characteristics of each device, applications running at the device, and any communication protocol supported by the device. A device can support more than one communication protocol, such as Bluetooth, Wi-Fi, wired, or ZigBee. In embodiments, a device (or selection function) can choose network paths at more granular level. The choice can account for bearers, and/or flow requirements of an application, where multiple flows/bearers are flowing from single or multiple applications having respective requirements. Devices can dynamically select different paths or gateways for different flows/bearers to provide a seamless experience to an end user. A flow can provide or indicate its requirements, e.g., in terms of packet error rate, packet delay budget, priority, etc. The device or application can choose any profile dynamically according to requirements. Moreover, a device can activate or use more than one communication protocol to communicate with different device paths as per the flow/bearer requirements.

The techniques discussed herein provide an efficient and network-assisted device flow routing method to find the best or optimal gateways and to manage topology selection. While the illustration above used GBR as a discriminating feature for D17 to select gateway G1 through D1 at one time, in general, many different criteria can factor into choosing a hierarchical device path. Moreover, the techniques can choose the optimal flow routing based on a single objective/requirement or multiple objectives/requirements. A multi-objective satisfaction algorithm can capitalize on known parameters in the gateway profiles to achieve a best-fit routing on a dynamic basis for different workloads at different times. When there is a single objective, it easier to decide on an optimal path.

Various multi-objective satisfaction algorithms (sometimes referred to as "constraint satisfaction algorithms" or "constrain satisfaction problems") can be used. The techniques herein provide a method/framework and required parameters which can be fed to a multi-modal objective satisfaction algorithm whose output can be applied for configuring a best path at the flow level. For example, a classical approach in solving multi-objective optimization problems is the weighted sum method, which has the advantage of identifying a single unique solution for actual implementation such as a particular network topology. In comparison, the Epsilon (ε)-constraint method generates multiple Pareto optimal solutions. Generally, when there is a problem to be solved, to turn it into a multi-objective satisfaction algorithm, one can define a variable set, a domain set and create a constraint set with variables and domains. Then, a computation or process is performed to find a solution, ideally an optimal one, answering the set of defined constraints setting the conditions that the variables must satisfy.

A primary provisioning device or service, such as the primary device 160, can dynamically configure gateways according to current workload conditions. Optionally, it may configure them statically if the policy specifies. The primary provisioning device will check a number of parameters (from possibly a rich list) to compute a best routing path based on traffic types that need to be supported. Every device will be running numbers of applications, with each application generating different type of workloads. Each workload has certain characteristics, such as priority, packet error budget, latency, energy, packet delay budget, maximum expected data burst, and various other requirements. Devices can be connected directly to a gateway, or to a gateway though one or more other devices. Similarly, a flow can traverse various devices (or device groups) and can have multiple paths to reach to the same gateway. Based on the characteristics of flow and other factors, it is proposed to choose best appropriate paths and gateways.

The techniques provide a number of advantages, including the freedom to dynamically choose a best routing path/gateway at a more granular level (e.g., at the bearer/flow level) and therefore provide a better quality of service to the end user.

Additionally, an administrator may select different profiles and choose each to apply dynamically at the device/application/flow level to satisfy dynamic end user quality requirements. As a first example, if due to network congestion, a packet error budget or latency cannot be matched for 'X' number of packets, then to compensate for that, the application flow can be channeled through another path which provides better latency and has a gateway that is less prone to packet errors for the next 'Y' packets, or for an interval that is calculated. As a second example, suppose it is desired to reduce power consumption. This can be achieved by choosing a designated low energy path (and gateways) at a certain time (e.g., 11 pm) when workload requirements are less stringent.

A further advantage is that, if an existing gateway is not performing up to the mark due to network congestion or other issues, other gateways can be dynamically selected.

The device flow routing techniques are network assisted and efficient. The techniques are designed to allow applications to achieve the best topology without having to be burdened with network management, and without having to be locked into static or inflexible choices. The techniques achieve dynamic topology management through the selection of hierarchical device paths and gateways based on a variety of parameters which include, but are not limited to: network parameters such as cell capacities, signal strengths, power, signal-to-noise ratio (SNR), available bands to select from and their characteristics, best-match frequencies, slicing information; application or operations parameters such as packet delay budgets, device/gateway metering capabilities, energy efficiency, Packet Data Protocol (PDP) context sharing; performance and SLA considerations such as latency requirements and jitter tolerance, error tolerance, whether GBR, non-GBR or delay-critical GBR is supported and so forth. Many other parameters can be accommodated with evolution of usages over time, as the techniques are not dependent upon any given set of parameters.

FIG. 1 illustrates a topology in which various devices are connected to each other using a set of protocols. For example, in a home, a network device can connect using Wi-Fi, Bluetooth, ZigBee, etc. In a car network, a device could be connected through a CAN/LIN bus and through various gateways, for example. Gateways could also be connected using non-3GPP access/wired protocols or by other means. As mentioned, D1 and D17 are GBR devices that generate a guaranteed bit rate flow; and the network is expected to fulfill latency, packet error rate and other requirements for this type of flow.

Figure 2:
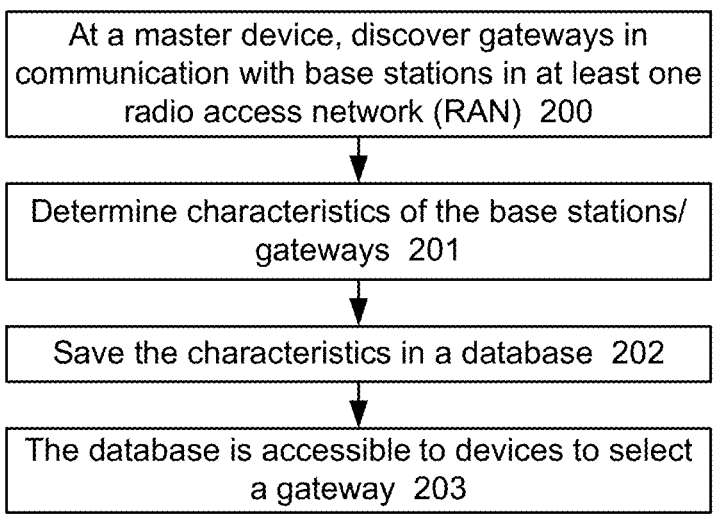
FIG. 2 depicts a flowchart of an example process for creating a database of characteristics of base stations in radio access networks (RANs) according to various embodiments.
Figure 5:
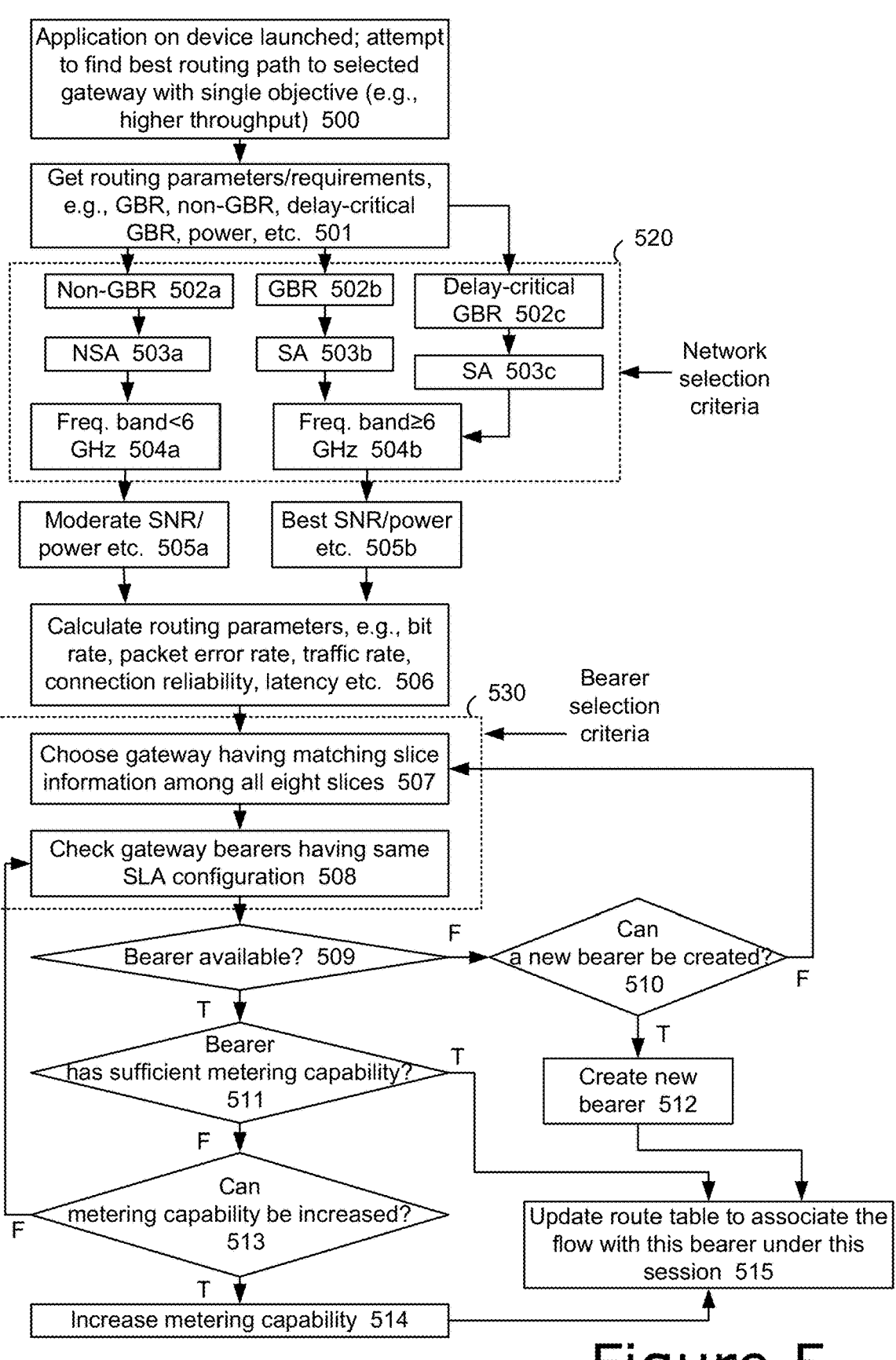
FIG. 5 depicts a flowchart of an example implementation of the process of FIG. 3 according to various embodiments.

During discovery, some or all capabilities of each gateway are extracted and saved in a profile in the database 161. In one example, the database 161 stores a first profile for gateway G1, a second profile for gateway G2, and so forth. Additionally or alternatively, the database 161 may store a single profile for all of the gateways, where a gateway identifier is used as an index for the capabilities of each gateway. Using the profile, a device can consider various characteristics/parameters among the profile parameters in a gateway profile in order to identify an optimal gateway. Here, the optimal gateway may be a gateway whose characteristics fit or fulfill the requirements of a subject device, application, flow, or workload at least in comparison with the characteristics of other gateways under consideration. For example, device D17, which may be a GBR device, can consider various characteristics/parameters among the profile parameters in order to identify the gateway that can optimally fulfil its SLA goals or needs (or the SLAs of an application, flow, or workload). In one example, D17 asks G3 to create one more bearer for a GBR flow. In another example, D17 has to choose G1 through D1 since G1 is already serving a GBR flow for D1. Similarly, D7 (or an application or flow operating at D7) has a non-GBR requirement. D7 is generating non-GBR flows which can be fulfilled by G2, so the best match paths can be any that happen to be optimal and such a choice can be dynamic, based on the volumes of traffic that are already utilizing available traffic capacities and/or other parameters, metrics, measurements, or characteristics. FIGS. 2 and 4 provide details of obtaining profiles and FIGS. 3 and 5 provide details of the use of other dynamic criteria for determining an optimal routing path.

FIG. 2 depicts a flowchart of an example process for creating a database of NAN and/or RAN characteristics of NANs in RANs according to various embodiments. At step 200, a primary device 160 discovers gateways in communication with base stations in at least one RAN. Step 201 include determining characteristics of the base stations/gateways. Step 202 includes saving the characteristics in a database. At step 203, the database is accessible to device to select a gateway. See FIG. 4 for further details.

Figure 3:
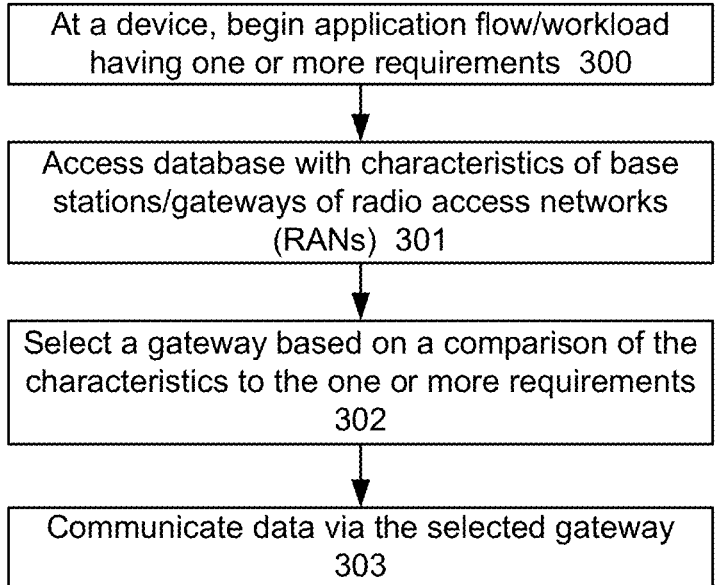
FIG. 3 depicts a flowchart of an example process for using a database of characteristics of base stations in radio access networks (RANs) to select a gateway and a routing path according to various embodiments.

FIG. 3 depicts a flowchart of an example process for using a database of characteristics of base stations in radio access networks (RANs) to select a gateway and a routing path according to various embodiments. At step 300, a device D1-D23 begins an application flow/workload having one or more requirements. Step 301 includes accessing a database with characteristics of base stations/gateways of radio access networks (RANs). Step 302 includes selecting a gateway based on a comparison of the characteristic to the one or more requirements. Step 303 includes communicating data via the selected gateway. See FIG. 5 for further details.

FIG. 4 depicts a flowchart of an example implementation of the process of FIG. 2 according to various embodiments. At step 400, a new gateway is discovered. Step 401 includes checking vendors available from a pre-configured plan. These can be, e.g., vendors associated with RANs/cell towers. Step 402 includes getting registration information and a registered class for every Access Point Name (APN) in a profile. In one example, step 402*a* can involve obtaining parameters according to a Mobile Broadband Interface Model (MBIM) such as depicted in step 402*a*.

Specifically, MBIMDataClass5G_NSA indicates whether the 5G Non-standalone (NSA) model of deployment is supported, where 5G services are provided without an end-to-end 5G network. Instead, the network will rely on some previous generation (e.g., 4G LTE) infrastructure or a mix of 4G LTE and 5G.

MBIMDataClass5G_SA indicates whether the 5G Standalone (SA) model of deployment is supported, where 5G services are provided through an end-to-end 5G network to ensure that the high performance features of 5G, including high-speed data and ultra-low latency, are delivered.

MBIMDataClassNone indicates whether a MBIM-_DATA_CLASS is supported.

MBIMDataClassGPRS indicates whether General Packet Radio Service (GPRS) is supported. This is packet-based 2G wireless communication service.

MBIMDataClassEDGE indicates whether Enhanced Data GSM Evolution (EDGE) is supported. This is another 2G technology which is slightly faster than GPRS.

MBIMDataClassUMTS indicates whether the Universal Mobile Telecommunications System (UMTS) is supported.

MBIMDataClassHSDPA indicates whether High-Speed Packet Access (HSPA) is supported.

MBIMDataClassHSUPA indicates whether High-Speed Uplink Packet Access (HSUPA) is supported.

MBIMDataClassLTE indicates whether Long-Term Evolution (LTE) is supported.

MBIMDataClass1xRTT indicates whether Single-Carrier Radio Transmission Technology (1xRTT) is supported. This is an operational mode for CDMA2000 wireless communications that specifies a single (1x) 1.25 MHz channel for data transfer.

MBIMDataClass1xEVDO indicates whether Evolution Data Optimized (1xEV-DO) is supported. This is a third-generation (3G) cellular data technology for GPRS-enabled cellular phones, networks and handheld devices.

MBIMDataClass1xEVDORevA indicates whether Revision A to 1xEV-DO is supported. This is an evolution of 1xEV-DO Rel. ( ) that increases the peak data rate on the reverse and forward links.

MBIMDataClass1xEVDV indicates whether 1x Evolution-Data and Voice is supported. This delivers integrated voice and simultaneous data multimedia services at peak data rates of 3.09 Mb/s per subscriber.

MBIMDataClass3xRTT indicates whether 3x Radio Transmission Technology (3xRTT) is supported. This is the second phase of CDMA2000 which specifies three 1.25 MHz channels for data transfer.

MBIMDataClass1xEVDORevB indicates whether Revision B to 1xEV-DO is supported.

MBIMDataClassUMB indicates whether Ultra Mobile Broadband (UMB) is supported. This refers to a fourth generation (4G) mobile communications technology that succeeds CDMA2000 and provides fast data rates with up to 275 Mbps downlink and 75 Mbps uplink speed.

MBIMDataClassCustom indicates whether a custom class is specified.

Step 403 includes getting cell information for the base stations for each application in the profile. In one example, step 403 can involve obtaining parameters such as depicted in step 403*a*.

Specifically, MaxNRCount indicates the maximum number of entries of both 5G New Radio (NR) serving cells and neighbor cells returned in a measurement result. in WWAN_NR_NEIGHBOR_CELLS (a measured results list of neighboring NR cells) and WWAN_NR_SERVING-_CELLS (a measured results list of 5G NR serving cells).

MaxGSMCount indicates a maximum number of entries of GSM neighboring cells returned in the GSM network measurement reports of WWAN_GSM_NMR (a network measurement report (NMR) of neighboring GSM cells).

MaxUMTSCount indicates the maximum number of entries of UMTS neighboring cells returned in the UMTS measured results list in WWAN_UMTS_MRL (the measured results list (MRL) of neighboring UMTS cells).

MaxTDSCDMACount indicates the maximum number of entries of TDSCDMA neighboring cells returned in the TDSCDMA measured results list in WWAN_TDSCD-MA_MRL (the measured results list (MRL) of neighboring TDSCDMA cells).

MaxLTECount indicates the maximum number of entries of LTE neighboring cells returned in the LTE measured results list in WWAN_LTE_MRL (the measured results list (MRL) of neighboring LTE cells).

MaxCDMACount indicates the maximum number of entries of CDMA cells returned in the CDMA measured results list in WWAN_CDMA_MRL (the measured results list (MRL) of both serving and neighboring CDMA cells). This list includes both serving and neighboring cells.

Step 404 includes checking the total cell count available and adding in the profile starting from the highest to the lowest cell count. Step 405 includes getting and adding supported frequency bands in the profile: Frequency Division Duplex (FDD), Time Division Duplex (TDD), Supplemental Downlink (SDL) and Supplemental Uplink (SUL). Step 405 further includes adding the Absolute Radio Frequency Channel Number (ARFCN). ARFCN is a code that specifies a pair of reference frequencies used for transmission and reception in radio system. In a FDD system, one ARFCN number is required for downlink and another for uplink, as downlink and uplink frequencies are different, while for a TDD system only one ARFCN number is enough as the downlink and uplink frequencies are the same.

Step 406 including checking and adding supported frequency bands in the profile from high frequency bands (≥6 GHz) for faster uplink/downlink to lower one available, in the form of ProviderIdOffset:NCI:PhysicalCellId: NRARFCN. In the MBIM, the WWAN_UMTS_MRL_INFO structure represents information about a neighboring UMTS cell. ProviderIdOffset is defined in the syntax of this structure. This offset in bytes, is calculated from the beginning of this structure, to a numeric (0-9) string called ProviderId that represents the network provider identity. This string is a concatenation of a three-digit Mobile Country Code (MCC) and a two or three-digit Mobile Network Code (MNC). This member can be NULL when no ProviderId information is returned. NCI refers to a Near Field Communication (NFC) Controller Interface (NCI). PhysicalCellId is used to indicate the physical layer identity of the cell. NRARFCN refers to New Radio ARFCN.

Step 407 includes adding in the profile from the highest to the lowest reference signal/power, the signal-to-noise ratio (SNR) for each cell. Step 408 includes getting the current signal/noise/quality available for the cells. This can involve obtaining measurements and/or metrics such as, for example, RSRP, RSRQ, SNR, SNIR, and/or other like measurements/metrics such as those discussed infra with respect to FIG. 6. Additionally, step 408 can involve determining or otherwise obtaining one or more statistical quantities or statistical analyses of the measurements/metrics such as, for example, determining averages, means, modes, mid-ranges, maximums, minimums, probability distributions, pivotal quantities, errors, correlations, variances, and/or other like data analyses.

Step 409 includes getting the supported slicing information available and including it in the profile. This can involve obtaining parameters such as depicted in step 409_a_. The required NSSAI is the Network Slice Selection Assistance Information (NSSAI). This can be obtained from the WWAN_SINGLE_NSSAI structure of MBIM. Step 410 includes getting the gateway power profile. Step 411 includes saving the profile.

In addition or alternatively to the examples of FIG. 4, other configurations and/or parameters may be used to create or update the gateway and/or NAN profiles. In some examples, steps 402 through 406 may involve obtaining or identifying information contained in one or more configurations such as radio resource control (RRC) parameters from various RRC configurations (see e.g., 3GPP TS 38.331 v16.6.0 (2021-09-28) and/or 3GPP TS 36.331 v16.6.0 (2021-09-29)); [IEEE80211] configurations including information in a network configuration (e.g., MAC state generic convergence function (MSGCF) link capabilities, MSGCF link parameters, event capabilities, etc.), location configuration information (LCI) report, mesh configuration, configuration profile report, and/or the like; and/or QoS configurations (e.g., QoS profile as discussed in 3GPP TS 38.300 v16.7.0 (2021-09-27), QoS info field and/or QoS traffic capability as discussed in [IEEE80211], etc.). Other RAN/WLAN configurations may be included in other implementations. In these ways, a profile can be provided for each gateway indicating the characteristics of the gateway and associated NANs in a RAN.

FIG. 5 depicts a flowchart of an example implementation of the process of FIG. 3 according to various embodiments. At step 500, an application on a device is launched and an attempt is made to find a best routing path to a selected gateway with a single objective such as higher throughput. For example, this could be one of the devices D1-D23 in FIG. 1. Step 501 including getting routing parameters/ requirements such as GBR, non-GBR, delay-critical GBR, power etc. which represent requirements of the application or an individual flow/workload of the application.

The box 520 represents steps in a network selection criteria. These involve evaluating characteristics of the available networks and their gateways. In a first example option, the network/gateway requires non-GBR (step 502_a_), NSA (step 503_a_) and a frequency band less than 6 GHz (step 504_a_). In a second example option, the network/gateway requires GBR (step 502_b_), SA (step 503_b_) and a frequency band greater than or equal to 6 GHz (step 504_b_). In a third example option, the network/gateway requires delay-critical GBR (step 502_c_), SA (step 503_c_) and a frequency band greater than or equal to 6 GHz (step 504_b_).

The air interface defined by 3GPP for 5G is known as New Radio (NR), and the specification is subdivided into two frequency bands, FR1 (below 6 GHz) and FR2 (24-54 GHz). The maximum channel bandwidth defined for FR1 is 100 MHz, due to the scarcity of continuous spectrum in this crowded frequency range. The band most widely being used for 5G in this range is 3.3-4.2 GHz. The minimum channel bandwidth defined for FR2 is 50 MHz and the maximum is 400 MHz, with two-channel aggregation supported in 3GPP Release 15. The higher the frequency, the greater the ability to support high data-transfer speeds.

In the first option, a device with a requirement for a non-GBR flow can favor a frequency band less than 6 GHz. Additionally, a NSA characteristic is acceptable for such a device when the high-speed data and ultra-low latency of the 5G NSA model are not required.

In the second option, a device with a requirement for a GBR flow can favor a frequency band greater than or equal to 6 GHz. A SA characteristic is also required for such a device when the high-speed data and ultra-low latency of the 5G NSA model is required.

In the third option, a device with a requirement for a delay-critical GBR flow can favor a frequency band greater than or equal to 6 GHz. A SA characteristic is also required.

Generally, non-GBR, GBR and delay-critical GBR are priority levels within a quality of service (QoS). Services using non-GBR flows should be prepared to experience congestion-related packet drops and delays. In uncongested scenarios, 98 percent of the packets should not experience a delay exceeding a Packet Delay Budget (PDB). For GBR flows, 98 percent of the packets shall not experience a delay exceeding the PDB. For delay-critical flows, a packet delayed more than the PDB is counted as lost if the data burst is not exceeding the Maximum Data Burst Volume (MDBV) within the period of the PDB and the flow is not exceeding the Guaranteed Flow Bit Rate (GFBR).

Non-GBR, GBR and delay-critical GBR provide different bit rate levels. NSA and SA are preferred/favored modes for different bit rates. Below 6 GHz and ≥6 GHz are preferred/favored frequency bands for different bit rates.

Step 505a follows the first option of the box 520 and indicates that a moderate SNR/power etc. is acceptable to meet the application/flows requirements. Step 505b follows the second and third options of the box 520 and indicates that a high, or best, SNR/power etc. is needed to meet the application/flows requirements. Moderate or high SNR/transmission powers are preferred/favored SNR/transmission powers for different bit rates.

Step 506 includes calculating routing parameters, e.g., bit rate, packet error rate, traffic rate, connection reliability, latency, etc.

The box 530 represents steps in a bearer selection criteria. Step 507 includes choosing a gateway having matching slice information among all eight slices. Network slicing allows carriers to create virtual data pipelines for each of its data type services, thereby assuring the QoS for each service. This can ensure the quality of data transmission for time-sensitive, mission-critical services such as connected cars and medical applications.

The identification of a network slice is done via the Single Network Slice Selection Assistance Information (S-NSSAI). The NSSAI is a collection of S-NSSAIs. Currently, 3GPP allows up to eight S-NSSAIs in the NSSAI sent in signaling messages between the user equipment/device and the network. This means a single device may be served by at most eight network slices at a time. The S-NSSAI signaled by the device to the network assists the network in selecting a particular network slice instance.

An S-NSSAI is comprised of: (a) a Slice/Service type (SST), which refers to the expected Network Slice behavior in terms of features and services; and (b) a Slice Differentiator (SD), which is optional information that complements the Slice/Service type(s) to differentiate amongst multiple Network Slices of the same Slice/Service type. The S-NSSAI may be associated with a PLMN (e.g., PLMN ID) and have network-specific values or have standard values. An S-NSSAI is used by the device in the access network in the PLMN that the S-NSSAI is associated with.

Step 508 includes checking the gateway bearers having the same SLA configuration.

A decision step 509 determines whether a bearer is available. If the decision step 509 is true (T), a decision step 511 determines whether the bearer has sufficient metering capability. If the decision step 511 is true, step 515 updates a route table to associate the flow with this bearer under this session. If the decision step 511 is false (F), a decision step 513 determines whether the metering capability (bit rate) of the bearer can be increased. If the decision step 513 is true, step 514 increases the metering capability and step 515 follows. If the decision step 513 is false, step 508 follows. If the decision step 509 is false, a decision step 510 determines whether a new connection (e.g., a new bearer) can be created. If the decision step 510 is true, a new bearer is created at step 512 and step 515 follows. If the decision step 510 is false, step 507 follows.

1. Edge Computing System Configurations and Arrangements

Generally, the techniques discussed herein can be used in edge computing. Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include Multi-access Edge Computing (MEC); Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes.

Figure 6:
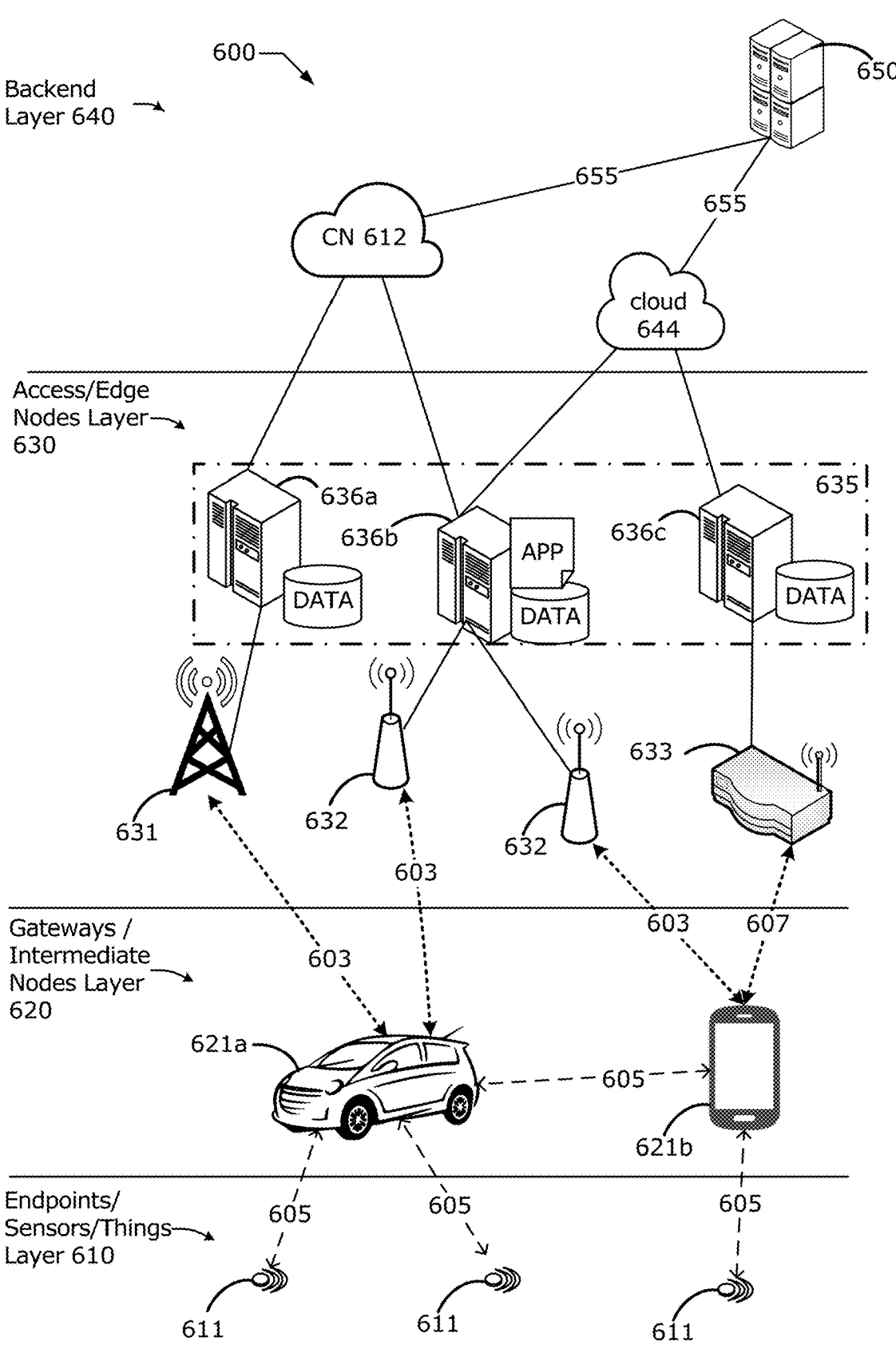
FIGS. 6, 7, and 8 depict example computing node scenarios according to various embodiments.

FIG. 6 illustrates an example edge computing environment 600. FIG. 6 specifically illustrates the different layers of communication occurring within the environment 600, starting from endpoint sensors or things layer 610 (e.g., operating in an Internet of Things (IoT) network topology) comprising one or more IoT devices 611 (also referred to as edge endpoints 610 or the like); increasing in sophistication to gateways or intermediate node layer 620 comprising one or more user equipment (UEs) 621a and 621b (also referred to as intermediate nodes 620 or the like), which facilitate the collection and processing of data from endpoints 610; increasing in processing and connectivity sophistication to access node layer 630 (or "edge node layer 630") comprising a plurality of network access nodes (NANs) 631, 632, and 633 (collectively referred to as "NANs 631-633" or the like) and a plurality of edge compute nodes 636a-c (collectively referred to as "edge compute nodes 636" or the like) within an edge computing system 635; and increasing in connectivity and processing sophistication to a backend layer 640 comprising core network (CN) 642 and cloud 644. The processing at the backend layer 640 may be enhanced by network services as performed by one or more remote application (app) servers 650 and/or other cloud services. Some or all of these elements may be equipped with or otherwise implement some or all features and/or functionality discussed herein.

The environment 600 is shown to include end-user devices, such as intermediate nodes 620 and endpoints 610, which are configured to connect to (or communicatively couple with) one or more multiple communication networks (also referred to as "access networks," "radio access networks," or the like) based on different access technologies (or "radio access technologies") for accessing application services. These access networks may include one or more of NANs 631, 632, and/or 633. The NANs 631-633 are arranged to provide network connectivity to the end-user devices via respective links 603, 607 between the individual NANs and the one or more UEs 611, 621.

As examples, the communication networks and/or access technologies may include cellular technology such as LTE, MuLTEfire, and/or NR/5G (e.g., as provided by RAN node 631 and/or RAN nodes 632), WiFi or wireless local area network (WLAN) technologies (e.g., as provided by access point (AP) 633 and/or RAN nodes 632), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 620 include UE 621a and UE 621b (collectively referred to as "UE 621" or "UEs 621"). In this example, the UE 621a is illustrated as a vehicle UE, and UE 621b is illustrated as a smartphone (e.g., handheld touchscreen mobile computing device connectable to one or more cellular networks). However, these UEs 621 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 610 include UEs 611, which may be IoT devices (also referred to as "IoT devices 611"), which are uniquely identifiable embedded computing devices (e.g., within the Internet infrastructure) that comprise a network access layer designed for low-power IoT applications utilizing short-lived UE connections. The IoT devices 611 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 611 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 611 can utilize technologies such as M2M or MTC for exchanging data with an MTC server (e.g., a server 650), an edge server 636 and/or edge computing system 635, or device via a PLMN, ProSe or D2D communication, sensor networks, or IoT networks. The M2M or MTC exchange of data may be a machine-initiated exchange of data.

The IoT devices 611 may execute background applications (e.g., keep-alive messages, status updates, etc.) to facilitate the connections of the IoT network. Where the IoT devices 611 are, or are embedded in, sensor devices, the IoT network may be a WSN. An IoT network describes an interconnecting IoT UEs, such as the IoT devices 611 being connected to one another over respective direct links 605. The IoT devices may include any number of different types of devices, grouped in various combinations (referred to as an "IoT group") that may include IoT devices that provide one or more services for a particular user, customer, organizations, etc. A service provider (e.g., an owner/operator of server 650, CN 642, and/or cloud 644) may deploy the IoT devices in the IoT group to a particular area (e.g., a geolocation, building, etc.) in order to provide the one or more services. In some implementations, the IoT network may be a mesh network of IoT devices 611, which may be termed a fog device, fog system, or fog, operating at the edge of the cloud 644. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 644 to Things (e.g., IoT devices 611). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 630) and/or a central cloud computing service (e.g., cloud 644) for performing heavy computations or computationally burdensome tasks. On the other hand, edge cloud computing consolidates human-operated, voluntary resources, as a cloud. These voluntary resource may include, inter-alia, intermediate nodes 620 and/or endpoints 610, desktop PCs, tablets, smartphones, nano data centers, and the like. In various implementations, resources in the edge cloud may be in one to two-hop proximity to the IoT devices 611, which may result in reducing overhead related to processing data and may reduce network delay.

Additionally or alternatively, the fog may be a consolidation of IoT devices 611 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 644. The fog operating at the edge of the cloud 644 may overlap or be subsumed into an edge network 630 of the cloud 644. The edge network of the cloud 644 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 636 or edge devices). The Fog layer resides on top of the edge layer and is a consolidation of networking devices such as the intermediate nodes 620 and/or endpoints 610 of FIG. 6.

Data may be captured, stored/recorded, and communicated among the IoT devices 611 or, for example, among the intermediate nodes 620 and/or endpoints 610 that have direct links 605 with one another as shown by FIG. 6. Analysis of the traffic flow and control schemes may be implemented by aggregators that are in communication with the IoT devices 611 and each other through a mesh network. The aggregators may be a type of IoT device 611 and/or network appliance. In the example of FIG. 6, the aggregators may be edge nodes 630, or one or more designated intermediate nodes 620 and/or endpoints 610. Data may be uploaded to the cloud 644 via the aggregator, and commands can be received from the cloud 644 through gateway devices that are in communication with the IoT devices 611 and the aggregators through the mesh network. Unlike the traditional cloud computing model, in some implementations, the cloud 644 may have little or no computational capabilities and only serves as a repository for archiving data recorded and processed by the fog. In these implementations, the cloud 644 centralized data storage system and provides reliability and access to data by the computing resources in the fog and/or edge devices. Being at the core of the architecture, the Data Store of the cloud 644 is accessible by both Edge and Fog layers of the aforementioned edge-fog network.

As mentioned previously, the access networks provide network connectivity to the end-user devices 620, 610 via respective NANs 631-633. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 631, 632. This virtualized framework allows the freed-up processor cores of the NANs 631, 632 to perform other virtualized applications, such as virtualized applications for various elements discussed herein.

The UEs 621, 611 may utilize respective connections (or channels) 603, each of which comprises a physical communications interface or layer. The connections 603 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 611, 621 and the NANs 631-633 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 611, 621 and NANs 631-633 may operate using LAA, enhanced LAA (eLAA), and/or further eLAA (feLAA) mechanisms. The UEs 621, 611 may further directly exchange communication data via respective direct links 605, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 621, 611 provide radio information to one or more NANs 631-633 and/or one or more edge compute nodes 636 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 621, 611 current location). As examples, the measurements collected by the UEs 621, 611 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per bit to interference power density ratio ($E_c/I_0$), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/ WiFi networks. Other measurements may be additionally or alternatively used, such as those discussed in 3GPP TS 36.214 v16.2.0 (2021-03-31) ("[TS36214]"), 3GPP TS 38.215 v16.4.0 (2020-12) ("[TS38215]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021-02-26) ("[IEEE80211]"), and/or the like. Additionally or alternatively, any of the aforementioned measurements (or combination of measurements) may be collected by one or more NANs 631-633 and provided to the edge compute node(s) 636.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/ or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 611, 621, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements.

The radio information may be reported in response to a trigger event and/or on a periodic basis. Additionally or alternatively, individual UEs 621, 611 report radio information either at a low periodicity or a high periodicity depending on a data transfer that is to take place, and/or other information about the data transfer. Additionally or alternatively, the edge compute node(s) 636 may request the measurements from the NANs 631-633 at low or high periodicity, or the NANs 631-633 may provide the measurements to the edge compute node(s) 636 at low or high periodicity. Additionally or alternatively, the edge compute node(s) 636 may obtain other relevant data from other edge compute node(s) 636, core network functions (NFs), application functions (AFs), and/or other UEs 611, 621 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/ bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a hardware (HW) configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP, ETSI O-RAN, and/or any other like standards such as those discussed herein.

The UE 621b is shown to be configured to access an access point (AP) 633 via a connection 607. In this example, the AP 633 is shown to be connected to the Internet without connecting to the CN 642 of the wireless system. The connection 607 can comprise a local wireless connection, such as a connection consistent with any IEEE 802.11 protocol, wherein the AP 633 would comprise a wireless fidelity (WiFi®) router. Additionally or alternatively, the UEs 621 and IoT devices 611 can be configured to communicate using suitable communication signals with each other or with any of the AP 633 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 631 and 632 that enable the connections 603 may be referred to as "RAN nodes" or the like. The RAN nodes 631, 632 may comprise ground stations (e.g., terrestrial access points) or satellite stations providing coverage within a geographic area (e.g., a cell). The RAN nodes 631, 632 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 631 is embodied as a NodeB, evolved NodeB (eNB), or a next generation NodeB (gNB), and the RAN nodes 632 are embodied as relay nodes, distributed units, or Road Side Unites (RSUs). Any other type of NANs can be used.

Any of the RAN nodes 631, 632 can terminate the air interface protocol and can be the first point of contact for the UEs 621 and IoT devices 611. Additionally or alternatively, any of the RAN nodes 631, 632 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. Additionally or alternatively, the UEs 611, 621 can be configured to communicate using OFDM communication signals with each other or with any of the NANs 631, 632 over a multicarrier communication channel in accordance with various communication techniques, such as, but not limited to, an OFDMA communication technique (e.g., for downlink communications) and/or an SC-FDMA communication technique (e.g., for uplink and ProSe or side link communications), although the scope is not limited in this respect.

For most cellular communication systems, the RAN function(s) operated by the RAN or individual NANs 631-632 organize downlink transmissions (e.g., from any of the RAN nodes 631, 632 to the UEs 611, 621) and uplink transmissions (e.g., from the UEs 611, 621 to RAN nodes 631, 632) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 611, 621 at each transmission time interval (TTI). A TTI is the duration of a transmission on a radio link 603, 605, and is related to the size of the data blocks passed to the radio link layer from higher network layers.

The NANs 631/632 may be configured to communicate with one another via respective interfaces or links (not shown), such as an X2 interface for LTE implementations (e.g., when CN 642 is an Evolved Packet Core (EPC)), an Xn interface for 5G or NR implementations (e.g., when CN 642 is an Fifth Generation Core (5GC)), or the like. The NANs 631 and 632 are also communicatively coupled to CN 642. Additionally or alternatively, the CN 642 may be an evolved packet core (EPC) network, a NextGen Packet Core (NPC) network, a 5G core (5GC), or some other type of CN. The CN 642 may comprise a plurality of network elements, which are configured to offer various data and telecommunications services to customers/subscribers (e.g., users of UEs 621 and IoT devices 611) who are connected to the CN 642 via a RAN. The components of the CN 642 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 642 may be referred to as a network slice, and a logical instantiation of a portion of the CN 642 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 642 components/functions.

The CN 642 is shown to be communicatively coupled to an application server 650 and a network 650 via an IP communications interface 655. The one or more server(s) 650 comprise one or more physical and/or virtualized systems for providing functionality (or services) to one or more clients (e.g., UEs 621 and IoT devices 611) over a network. The server(s) 650 may include various computer devices with rack computing architecture component(s), tower computing architecture component(s), blade computing architecture component(s), and/or the like. The server(s) 650 may represent a cluster of servers, a server farm, a cloud computing service, or other grouping or pool of servers, which may be located in one or more datacenters. The server(s) 650 may also be connected to, or otherwise associated with one or more data storage devices (not shown). Moreover, the server(s) 650 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 650 offer applications or services that use IP/network resources. As examples, the server(s) 650 may provide traffic management services, cloud analytics, content streaming services, immersive gaming experiences, social networking and/or microblogging services, and/or other like services. In addition, the various services provided by the server(s) 650 may include initiating and controlling software and/or firmware updates for applications or individual components implemented by the UEs 621 and IoT devices 611. The server(s) 650 can also be configured to support one or more communication services (e.g., Voice-over-Internet Protocol (VoIP) sessions, PTT sessions, group communication sessions, social networking services, etc.) for the UEs 621 and IoT devices 611 via the CN 642.

The Radio Access Technologies (RATs) employed by the NANs 631-633, the UEs 621, 611, and the other elements in FIG. 6 may include, for example, any of the communication protocols and/or RATs discussed herein. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). These RATs may include one or more V2X RATs, which allow these elements to communicate directly with one another, with infrastructure equipment (e.g., NANs 631-633), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, IEEE 1609.0-2019, "IEEE Guide for Wireless Access in Vehicular Environments (WAVE) Architecture" (2019-04-10) ("[IEEE16090]"), SAE Intl, "V2X Communications Message Set Dictionary" (formerly "Dedicated Short Range Communication (DSRC) Message Set Dictionary") (2020-07-23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018-03-02) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020-01) (hereinafter "[EN302663]") and describes the access layer of the ITS-S reference architecture. The ITS-G5 access layer comprises [IEEE80211] (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018-04) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03).

The cloud 644 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 644 include application capabilities type, infrastructure capabilities type, and platform capabilities type. A cloud capabilities type is a classification of the functionality provided by a cloud service to a cloud service customer (e.g., a user of cloud 644), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 644 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 644 may represent one or more cloud servers, application servers, web servers, and/or some other remote infrastructure. The remote/cloud servers may include any one of a number of services and capabilities such as, for example, any of those discussed herein.

Additionally or alternatively, the cloud 644 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 644 may be a network that comprises computers, network connections among the computers, and software routines to enable communication between the computers over network connections. In this regard, the cloud 644 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 644 may be via a wired or a wireless connection using the various communication protocols discussed infra. More than one network may be involved in a communication session between the illustrated devices. Connection to the cloud 644 may require that the computers execute software routines which enable, for example, the seven layers of the OSI model of computer networking or equivalent in a wireless (cellular) phone network. Cloud 644 may be used to enable relatively long-range communication such as, for example, between the one or more server(s) 650 and one or more UEs 621 and IoT devices 611. Additionally or alternatively, the cloud 644 may represent the Internet, one or more cellular networks, local area networks, or wide area networks including proprietary and/or enterprise networks, TCP/Internet Protocol (IP)-based network, or combinations thereof. In these implementations, the cloud 644 may be associated with network operator who owns or controls equipment and other elements necessary to provide network-related services, such as one or more base stations or access points, one or more servers for routing digital data or telephone calls (e.g., a core network or backbone network), etc. The backbone links 655 may include any number of wired or wireless technologies, and may be part of a LAN, a WAN, or the Internet. In one example, the backbone links 655 are fiber backbone links that couple lower levels of service providers to the Internet, such as the CN 612 and cloud 644.

The edge compute nodes 636 may include or be part of an edge system 635 (or edge network 635). The edge compute nodes 636 may also be referred to as "edge hosts 636" or "edge servers 636." The edge system 635 includes a collection of edge servers 636 and edge management systems (not shown by FIG. 6) necessary to run edge computing applications within an operator network or a subset of an operator network. The edge servers 636 are physical computer systems that may include an edge platform and/or virtualization infrastructure, and provide compute, storage, and network resources to edge computing applications. Each of the edge servers 636 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 620 and/or endpoints 610. The VI of the edge servers 636 provide virtualized environments and virtualized resources for the edge hosts, and the edge computing applications may run as VMs and/or application containers on top of the VI. One example implementation of the edge system 635 is an MEC system 635. It should be understood that the disclosed MEC systems and services deployment examples are only one illustrative example of edge computing systems/networks 635, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 6, each of the NANs 631, 632, and 633 are co-located with edge compute nodes (or "edge servers") 636*a*, 636*b*, and 636*c*, respectively. These implementations may be small-cell clouds (SCCs) where an edge compute node 636 is co-located with a small cell (e.g., pico-cell, femto-cell, etc.), or may be mobile micro clouds (MCCs) where an edge compute node 636 is co-located with a macro-cell (e.g., an eNB, gNB, etc.). The edge compute node 636 may be deployed in a multitude of arrangements other than as shown by FIG. 6. In a first example, multiple NANs 631-633 are co-located or otherwise communicatively coupled with one edge compute node 636. In a second example, the edge servers 636 may be co-located or operated by RNCs, which may be the case for legacy network deployments, such as 3G networks. In a third example, the edge servers 636 may be deployed at cell aggregation sites or at multi-RAT aggregation points that can be located either within an enterprise or used in public coverage areas. In a fourth example, the edge servers 636 may be deployed at the edge of CN 642. These implementations may be used in follow-me clouds (FMC), where cloud services running at distributed data centers follow the UEs 621 as they roam throughout the network.

In any of the implementations discussed herein, the edge servers 636 provide a distributed computing environment for application and service hosting, and also provide storage and processing resources so that data and/or content can be processed in close proximity to subscribers (e.g., users of UEs 621, 611) for faster response times The edge servers 636 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 636 from the UEs 611/621, CN 642, cloud 644, and/or server(s) 650, or vice versa. For example, a device application or client application operating in a UE 621/611 may offload application tasks or workloads to one or more edge servers 636. In another example, an edge server 636 may offload application tasks or workloads to one or more UE 621/611 (e.g., for distributed ML computation or the like).

2. Hardware Components

The network components and/or the various devices and/or systems discussed herein may be servers, appliances, network infrastructure, machines, robots, drones, and/or any other type of computing devices. For example, any of the computing devices discussed herein may be a self-contained electronic device including a housing, a chassis, a case or a shell. In some circumstances, the housing may be dimensioned for portability such that it can be carried by a human and/or shipped. Additionally or alternatively, the housing may be a smaller module suitable for installation in a vehicle, for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7. The edge cloud may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figures 7, 8:
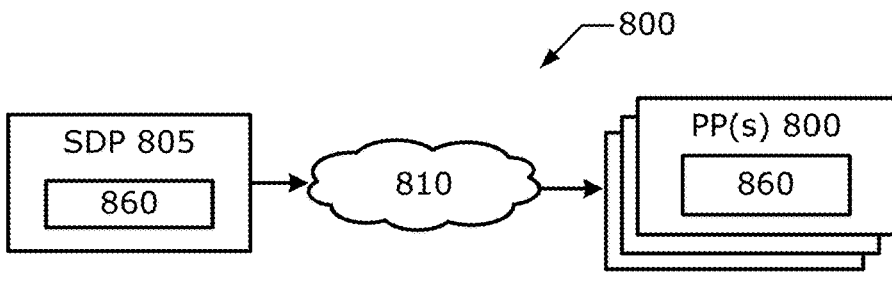

FIG. 7 illustrates an example of components that may be present in a computing node 750 for implementing the techniques (e.g., operations, processes, methods, and methodologies) described herein. The compute node 750 provides a closer view of the respective components of node 700 when implemented as or as part of a computing device (e.g., as a mobile device, a base station, server, gateway, etc.). The compute node 750 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 750, or as components otherwise incorporated within a chassis of a larger system.

In some embodiments, compute node 750 may correspond to the devices D1-D23 or the primary device 160 of FIG. 1; UEs 611, 621*a*, NANs 631-633, edge compute node(s) 636, CN 642 (or compute node(s) therein), and/or cloud 644 (or compute node(s) therein) of FIG. 6; software distribution platform 805 and/or processor platform(s) 800 of FIG. 8; and/or any other component, device, and/or system discussed herein. The compute node 750 may be embodied as a type of device, appliance, computer, or other "thing" capable of communicating with other edge, networking, or endpoint components. For example, compute node 750 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 750 includes processing circuitry in the form of one or more processors 752. The processor circuitry 752 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 752 may include one or more hardware accelerators (e.g., same or similar to acceleration circuitry 764), which may be microprocessors, programmable processing devices (e.g., FPGA, ASIC, etc.), or the like. The one or more accelerators may include, for example, computer vision and/or deep learning accelerators. In some implementations, the processor circuitry 752 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 752 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 752 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 752 may work in coordination with each other to execute many types of operations and instructions within and on behalf of the compute node 750.

The processors (or cores) 752 may be coupled with or may include memory/storage and may be configured to execute instructions stored in the memory/storage to enable various applications or operating systems to run on the platform 750. The processors (or cores) 752 is configured to operate application software to provide a specific service to a user of the platform 750. Additionally or alternatively, the processor(s) 752 may be a special-purpose processor(s)/controller(s) configured (or configurable) to operate according to the elements, features, and implementations discussed herein.

As examples, the processor(s) 752 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multi-media Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 752 may be a part of a system on a chip (SoC), System-in-Package (SiP), a multi-chip package (MCP), and/or the like, in which the processor(s) 752 and other components are formed into a single integrated circuit, or a single package, such as the Edison™ or Galileo™ SoC boards from Intel® Corporation. Other examples of the processor(s) 752 are mentioned elsewhere in the present disclosure.

The processor(s) 752 may communicate with system memory 754 over an interconnect (IX) 756. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the IX 756. In an example, the storage 758 may be implemented via a solid-state disk drive (SSDD) and/or high-speed electrically erasable memory (commonly referred to as "flash memory"). Other devices that may be used for the storage 758 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 754 and/or storage circuitry 758 may also incorporate three-dimensional (3D) cross-point (XPOINT) memories from Intel® and Micron®.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components of edge computing device 750 may communicate over an interconnect (IX) 756. The IX 756 may represent any suitable type of connection or interface such as, for example, metal or metal alloys (e.g., copper, aluminum, etc.), fiber, and/or the like. The IX 756 may include any number of IX, fabric, and/or interface technologies, including instruction set architecture (ISA), extended ISA (eISA), Inter-Integrated Circuit (I2C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 756 may be a proprietary bus, for example, used in a SoC based system. In some implementations, the IX 756 connects the compute node 750 with the devices D1-D23 or primary device 160 discussed previously with respect to FIG. 1.

The IX 756 couples the processor 752 to communication circuitry 766 for communications with other devices, such as a remote server (not shown) and/or the connected edge devices 762. The communication circuitry 766 is a hardware element, or collection of hardware elements, used to communicate over one or more networks (e.g., cloud 763) and/or with other devices (e.g., edge devices 762).

The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the compute node 750 may communicate with close devices, e.g., within about 10 meters, using a local transceiver based on BLE, or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 763 via local or wide area network protocols. The wireless network transceiver 766 may be an LPWA transceiver that follows the IEEE 802.15.4, or IEEE 802.15.4g standards, among others. The compute node 763 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP specifications, such as LTE and 5G/NR communication systems, discussed in further detail at the end of the present disclosure. A network interface controller (NIC) 768 may be included to provide a wired communication to nodes of the edge cloud 763 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 768 may be included to enable connecting to a second network, for example, a first NIC 768 providing communications to the cloud over Ethernet, and a second NIC 768 providing communications to other devices over another type of network. In some implementations, the NIC 768 and/or the transceiver 766 may communicatively couple the compute node 750 with the D1-D23 or primary device 160 discussed previously with respect to FIG. 1. In these implementations, the connected edge devices 762 may include the devices D1-D23 or primary device 160.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The compute node 750 may include or be coupled to acceleration circuitry 764, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 764 may comprise logic blocks or logic fabric and other interconnected resources that may be programmed (configured) to perform various functions, such as the procedures, methods, functions, etc. discussed herein. In such implementations, the acceleration circuitry 764 may also include memory cells (e.g., EPROM, EEPROM, flash memory, static memory (e.g., SRAM, anti-fuses, etc.) used to store logic blocks, logic fabric, data, etc. in LUTs and the like.

The IX 756 also couples the processor 752 to a sensor hub or external interface 770 that is used to connect additional devices or subsystems. The additional/external devices may include sensors 772, actuators 774, and positioning circuitry 775. In some implementations, the additional/external devices may include the D1-D23 or primary device 160 discussed previously with respect to FIG. 1.

The sensor circuitry 772 includes devices, modules, or subsystems whose purpose is to detect events or changes in its environment and send the information (sensor data) about the detected events to some other a device, module, subsystem, etc. Examples of such sensors 772 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 750); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 774, allow platform 750 to change its state, position, and/or orientation, or move or control a mechanism or system. The actuators 774 comprise electrical and/or mechanical devices for moving or controlling a mechanism or system, and converts energy (e.g., electric current or moving air and/or liquid) into some kind of motion. The actuators 774 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 774 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 750 may be configured to operate one or more actuators 774 based on one or more captured events and/or instructions or control signals received from a service provider and/or various client systems.

The positioning circuitry 775 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 775 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 775 may include a Micro-Technology for Positioning, Navigation, and Timing (Micro-PNT) IC that uses a primary timing clock to perform position tracking/estimation without GNSS assistance. The positioning circuitry 775 may also be part of, or interact with, the communication circuitry 766 to communicate with the nodes and components of the positioning network. The positioning circuitry 775 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 775 is, or includes an INS, which is a system or device that uses sensor circuitry 772 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the platform 750 without the need for external references.

In some optional examples, various input/output (I/O) devices may be present within or connected to, the compute node 750, which are referred to as input circuitry 786 and output circuitry 784 in FIG. 7. The input circuitry 786 and output circuitry 784 include one or more user interfaces designed to enable user interaction with the platform 750 and/or peripheral component interfaces designed to enable peripheral component interaction with the platform 750. Input circuitry 786 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 784 may be included to show information or otherwise convey information, such as sensor readings, actuator position(s), or other like information. Data and/or graphics may be displayed on one or more user interface components of the output circuitry 784. Output circuitry 784 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 750. The output circuitry 784 may also include speakers or other audio emitting devices, printer(s), and/or the like. Additionally or alternatively, the sensor circuitry 772 may be used as the input circuitry 784 (e.g., an image capture device, motion capture device, or the like) and one or more actuators 774 may be used as the output device circuitry 784 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases. In some implementations, the output device circuitry 784 may include the D1-D23 or primary device 160 discussed previously with respect to FIG. 1.

A battery 776 may power the compute node 750, although, in examples in which the compute node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the compute node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 778 may communicate the information on the battery 776 to the processor 752 over the IX 756. The battery monitor/charger 778 may also include an analog-to-digital (ADC) converter that enables the processor 752 to directly monitor the voltage of the battery 776 or the current flow from the battery 776. The battery parameters may be used to determine actions that the compute node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the compute node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 783 in the form of software, firmware, or hardware commands to implement the techniques described herein. Although such instructions 782, 783 are shown as code blocks included in the memory 754 and the storage 758, any of the code blocks 782, 783 may be replaced with hardwired circuits, for example, built into an application specific integrated circuit (ASIC) or programmed into an FPGA, or the like.

In an example, the instructions 781, 782, 783 provided via the memory 754, the storage 758, or the processor 752 may be embodied as a non-transitory machine-readable medium (NTMRM) 760 including code to direct the processor 752 to perform electronic operations in the compute node 750. The processor 752 may access the NTMRM 760 over the IX 756. For instance, the NTMRM 760 may be embodied by devices described for the storage 758 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 781, 782, 783) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, PHP, Pearl, Python, Ruby on Rails, and/or the like; a markup language such as Hypertext Markup Language (HTML), Extensible Markup Language (XML), Java Script Object Notion (JSON), Apex®, Abstract Syntax Notation One (ASN.1), Google® Protocol Buffers (protobuf), or the like; some other suitable programming languages including proprietary programming languages and/or development tools, or any other languages tools. The computer program code 781, 782, 783 for carrying out operations of the present disclosure may also be written in any combination of the programming languages discussed herein. The program code may execute entirely on the system 750, partly on the system 750, as a stand-alone software package, partly on the system 750 and partly on a remote computer or entirely on the remote computer or server. In the latter scenario, the remote computer may be connected to the system 750 through any type of network, including a LAN or WAN, or the connection may be made to an external computer (e.g., through the Internet using an Internet Service Provider).

In an example, the instructions 781, 782, 783 on the processor circuitry 752 (separately, or in combination with the instructions 781, 782, 783) may configure execution or operation of a trusted execution environment (TEE) 790. The TEE 790 operates as a protected area accessible to the processor circuitry 702 to enable secure access to data and secure execution of instructions. In some embodiments, the TEE 790 may be a physical hardware device that is separate from other components of the system 750 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 790 may be implemented as secure enclaves, which are isolated regions of code and/or data within the processor and/or memory/storage circuitry of the system 750. Only code executed within a secure enclave may access data within the same secure enclave, and the secure enclave may only be accessible using the secure application (which may be implemented by an application processor or a tamper-resistant microcontroller). Various implementations of the TEE 790, and an accompanying secure area in the processor circuitry 752 or the memory circuitry 754 and/or storage circuitry 758 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 700 through the TEE 790 and the processor circuitry 752. Additionally or alternatively, the memory circuitry 754 and/or storage circuitry 758 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 704 and/or storage circuitry 708 may be divided into one or more trusted memory regions for storing applications or software modules of the TEE 790.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 7 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

FIG. 8 illustrates an example software (SW) distribution platform (SDP) 805 to distribute software 860, such as the example computer readable instructions 781, 782, 783 of FIG. 7, to one or more devices, such as example processor platform(s) (pp) 800, connected edge devices 762 (see e.g., FIG. 7), and/or any of the other computing systems/devices discussed herein. The SDP 805 (or components thereof) may be implemented by any computer server, data facility, cloud service, CDN, edge computing framework, etc., capable of storing and transmitting software (e.g., code, scripts, executable binaries, containers, packages, compressed files, and/or derivatives thereof) to other computing devices (e.g., third parties, the example connected edge devices 762 of FIG. 7). The SDP 805 (or components thereof) may be located in a cloud (e.g., data center, etc.), a local area network, an edge network, a wide area network, on the Internet, and/or any other location communicatively coupled with the pp 800.

The pp 800 and/or connected edge devices 762 connected edge devices 762 may include customers, clients, managing devices (e.g., servers), third parties (e.g., customers of an entity owning and/or operating the SDP 805), IoT devices, and the like. The pp 800/connected edge devices 762 may operate in commercial and/or home automation environments. In some examples, a third party is a developer, a seller, and/or a licensor of software such as the example computer readable media 781, 782, 783 of FIG. 7. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.). In some examples, the pp 800/connected edge devices 762 can be physically located in different geographic locations, legal jurisdictions, etc.

In FIG. 8, the SDP 805 includes one or more servers (referred to as "servers 805") and one or more storage devices (referred to as "storage 805"). The storage 805 store the computer readable instructions 860, which may correspond to the instructions 781, 782, 783 of FIG. 7. The servers 805 are in communication with a network 810, which may correspond to any one or more of the Internet and/or any of the example networks as described herein. The servers 805 are responsive to requests to transmit the software to a requesting party as part of a commercial transaction. Payment for the delivery, sale and/or license of the software may be handled by the servers 805 and/or via a third-party payment entity. The servers 805 enable purchasers and/or licensors to download the computer readable instructions 860 from the SDP 805.

The servers 805 are communicatively connected to one or more security domains and/or security devices through which requests and transmissions of the example computer readable instructions 860 must pass. Additionally or alternatively, the servers 805 periodically offer, transmit, and/or force updates to the software 860 to ensure improvements, patches, updates, etc. are distributed and applied to the software at the end user devices. The computer readable instructions 860 are stored on storage 805 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.), and/or any other format such as those discussed herein. In some examples, the computer readable instructions 860 stored in the SDP 805 are in a first format when transmitted to the pp 800. Additionally or alternatively, the first format is an executable binary in which particular types of the pp 800 can execute. Additionally or alternatively, the first format is uncompiled code that requires one or more preparation tasks to transform the first format to a second format to enable execution on the pp 800. For example, the receiving pp 800 may need to compile the computer readable instructions 860 in the first format to generate executable code in a second format that is capable of being executed on the pp 800. Additionally or alternatively, the first format is interpreted code that, upon reaching the pp 800, is interpreted by an interpreter to facilitate execution of instructions. Additionally or alternatively, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

3. Example Implementations

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1

Example Z01 includes one or more computer readable media comprising instructions, wherein execution of the instructions by processor circuitry is to cause the processor circuitry to perform the method of any one of examples 1-20.

Example Z02 includes a computer program comprising the instructions of example Z01.

Example Z03a includes an Application Programming Interface defining functions, methods, variables, data structures, and/or protocols for the computer program of example Z02.

Example Z03b includes an API or specification defining functions, methods, variables, data structures, protocols, etc., defining or involving use of any of examples 1-20 or portions thereof, or otherwise related to any of examples 1-20 or portions thereof.

Example Z04 includes an apparatus comprising circuitry loaded with the instructions of example Z01.

Example Z05 includes an apparatus comprising circuitry operable to run the instructions of example Z01.

Example Z06 includes an integrated circuit comprising one or more of the processor circuitry of example Z01 and the one or more computer readable media of example Z01.

Example Z07 includes a computing system comprising the one or more computer readable media and the processor circuitry of example Z01.

Example Z08 includes an apparatus comprising means for executing the instructions of example Z01.

Example Z09 includes a signal generated as a result of executing the instructions of example Z01.

Example Z10 includes a data unit generated as a result of executing the instructions of example Z01.

Example Z11 includes the data unit of example Z10 and/or some other example(s) herein, wherein the data unit is a datagram, network packet, data frame, data segment, a Protocol Data Unit (PDU), a Service Data Unit (SDU), a message, or a database object.

Example Z12 includes a signal encoded with the data unit of examples Z10 and/or Z11.

Example Z13 includes an electromagnetic signal carrying the instructions of example Z01.

Example Z14 includes an apparatus comprising means for performing the method of any one of examples 1-20 and/or some other example(s) herein.

Example Z15 includes an edge compute node executing a service as part of one or more edge applications instantiated on virtualization infrastructure, the service being related to any of examples 1-20, portions thereof, and/or some other example(s) herein.

4. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "measurement" at least in some embodiments refers to the observation and/or quantification of attributes of an object, event, or phenomenon.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The terms "ego" and "subject" (as in, e.g., "subject flow") at least in some embodiments refers to an entity, element, device, system, flow, stream, etc., that is under consideration or being considered. The terms "neighbor" and "proximate" (as in, e.g., "proximate device") at least in some embodiments refers to an entity, element, device, system, etc., other than an ego or subject entity.

The terms "master" and "slave" at least in some embodiments refers to a model of asymmetric communication or control where one device, process, element, or entity (the "master") controls one or more other device, process, element, or entity (the "slaves"). The terms "master" and "slave" are used in this disclosure only for their technical meaning. The term "master" or "grandmaster" may be substituted with any of the following terms "main", "source", "primary", "initiator", "requestor", "transmitter", "host", "maestro", "controller", "provider", "producer", "client", "source", "mix", "parent", "chief", "manager", "reference" (e.g., as in "reference clock" or the like), and/or the like. Additionally, the term "slave" may be substituted with any of the following terms "receiver", "secondary", "subordinate", "replica", target", "responder", "device", "performer", "agent", "standby", "consumer", "peripheral", "follower", "server", "child", "helper", "worker", "node", and/or the like.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmut-mounted display devices, augmented reality (AR) devices, virtual reality (VR) devices, mixed reality (MR) devices, and/or other like systems or devices.

The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "base station" at least in some embodiments refers to a network element in a radio access network (RAN), such as a fourth-generation (4G) or fifth-generation (5G) mobile communications network which is responsible for the transmission and reception of radio signals in one or more cells to or from a UE. A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved Node B (eNB) or a next generation Node B (gNB). In some examples, the base station may operate or include compute hardware to operate as a compute node. However, in many of the scenarios discussed herein, a RAN node may be substituted with an access point (e.g., wireless network access point) or other network access hardware.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021-07-09)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "Central Unit" or "CU" at least in some embodiments refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "gateway" at least in some embodiments refers to an appliance, network element, or some other hardware device that acts as a gate between two or more networks or subnetworks. Additionally or alternatively, the term "gateway" at least in some embodiments refers to an appliance, network element, or some other hardware device that enables traffic to flow in and out of the network.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-

RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" at least in some embodiments refers to compute, storage, and/or network resources provided by physical hardware element(s). A "virtualized resource" at least in some embodiments refers to compute, storage, and/or network resources provided by virtualization infrastructure to an application, device, system, etc. The term "network resource" or "communication resource" at least in some embodiments refers to resources that are accessible by computer devices/systems via a communications network. The term "system resources" at least in some embodiments refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "access edge layer" indicates the sub-layer of infrastructure edge closest to the end user or device. For example, such layer may be fulfilled by an edge data center deployed at a cellular network site. The access edge layer functions as the front line of the infrastructure Edge and may connect to an aggregation Edge layer higher in the hierarchy.

The term "aggregation edge layer" indicates the layer of infrastructure edge one hop away from the access edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" (or VNF) indicates a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. The term "Edge IoT devices" at least in some embodiments refers to any kind of IoT devices deployed at a network's edge.

The term "flow" at least in some embodiments refers to a sequence of data and/or data units from a source entity/element to a destination entity/element. Additionally or alternatively, the term "flow" at least in some embodiments refer to a sequence or set of data units in a specific transport connection, session, stream, or the like. Additionally or alternatively, the terms "flow" or "traffic flow" at least in some embodiments refer to a set of data and/or data units passing an observation point in a network during a time interval. For purposes of the present disclosure, the terms "flow", "traffic flow", "data flow", "dataflow", "packet flow", "network flow", and/or "bearer" may be used interchangeably even though these terms at least in some embodiments refer to different concepts.

The term "stream" at least in some embodiments refers to a sequence of data elements made available over time. Additionally or alternatively, the term "stream" or "streaming" refers to a manner of processing in which an object, data, and/or data units are processed "on the fly" as a sequence of events.

The term "data unit" at least in some embodiments at least in some embodiments refers to a basic transfer unit associated with a network. In some examples, a data unit may be structured to have header and payload sections each of which may include one or more data fields and/or data elements. The term "data unit" at least in some embodiments may be referred to as a datagram, a protocol data unit (PDU), a service data unit (SDU), a frame, a packet, and/or the like.

The term "Quality of Service" or "QoS' at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein.

The term "optimization" at least in some embodiments refers to an act, process, or methodology of making something (e.g., a design, system, or decision) as fully perfect, functional, or effective as possible. Optimization usually includes mathematical procedures such as finding the maximum or minimum of a function. The term "optimal" at least in some embodiments refers to a most desirable or satisfactory end, outcome, or output. The term "optimum" at least in some embodiments refers to an amount or degree of something that is most favorable to some end. The term "optima" at least in some embodiments refers to a condition, degree, amount, or compromise that produces a best possible result. Additionally or alternatively, the term "optima" at least in some embodiments refers to a most favorable or advantageous outcome or result.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus to be associated with one or more network devices, the apparatus comprising:
   a memory to store instructions; and
   a processor to execute the instructions, the instructions, when executed by the processor resulting in performance of operations comprising:
       determine one or more requirements of a subject flow of a set of flows of an application;
       obtain, from a database, characteristics of at least one radio access network (RAN); and
       select, for the subject flow, a gateway among a plurality of gateways to access the at least one RAN based on a comparison of the obtained characteristics to the one or more requirements of the subject flow;
       wherein:
           the apparatus is to execute the application;
           the database is to be distributed, at least in part, in respective local versions of the database in the apparatus and the one or more network devices; and
           the respective local versions of the database are to be updated with updated information to be used in determining dynamic traffic splitting and/or dynamic traffic shaping.

2. The apparatus of claim 1, wherein the characteristics comprise parameters of a Mobile Broadband Interface Model (MBIM).

3. The apparatus of claim 1, wherein the processor is to execute the instructions to select different gateways from among the plurality of gateways to access the at least one RAN for different flows of the application.

4. The apparatus of claim 1, wherein the processor is to execute the instructions to select different paths for the subject flow to the at least one RAN at different times.

5. The apparatus of claim 1, wherein the processor is to execute the instructions to select different gateways from among the plurality of gateways for the subject flow at different times.

6. The apparatus of claim 1, wherein the selection of the gateway from among the plurality of gateways is based on an output of a multi-objective satisfaction algorithm.

7. The apparatus of claim 6, wherein the processor is to execute the instructions to operate the multi-objective satisfaction algorithm to select the gateway from among the plurality of gateways.

8. The apparatus of claim 1, wherein the processor is to execute the instructions to:
   prioritize selection of a gateway among the plurality of gateways in communication with a network access node (NAN) of a standalone network over a gateway among the plurality of gateways in communication with a NAN of a non-standalone network when a requirement of the one or more requirements is a guaranteed bit rate requirement.

9. The apparatus of claim 1, wherein the processor is to execute the instructions to:
   prioritize selection of a gateway among the plurality of gateways in communication with a NAN configured to operate at a sub-band greater than 6 GHz over a gateway among the plurality of gateways in communication with a NAN configured to operate at a sub-band less than 6 GHz when a requirement of the one or more requirements is a guaranteed bit rate requirement.

10. The apparatus of claim 1, wherein the processor is to execute the instructions to:

prioritize selection of a gateway among the plurality of gateways in communication with a NAN having a higher signal quality than other NANs over a gateway among the plurality of gateways in communication with a NAN having a lower signal quality than at least one other NAN when a requirement of the one or more requirements is a high signal quality requirement.

11. The apparatus of claim 1, wherein the processor is to execute the instructions to:

prioritize selection of a gateway among the plurality of gateways in communication with a NAN configured for Frequency Division Duplex (FDD) communication over a gateway among the plurality of gateways in communication with a NAN configured for Time Division Duplex (TDD) communication when a requirement of the one or more requirements is a low latency requirement.

12. The apparatus of claim 1, wherein, when a requirement of the one or more requirements is a requirement for a guaranteed bit rate, the processor is to execute the instructions to:

prioritize selection of a default gateway of the plurality of gateways when the default gateway has a capacity to provide the guaranteed bit rate; and prioritize selection of another gateway of the plurality of gateways over the default gateway if the default gateway does not have the capacity to provide the guaranteed bit rate and the other gateway has the capacity to provide the guaranteed bit rate.

13. The apparatus of claim 1, wherein the processor is to execute the instructions to:

determine, after selection of the gateway among a plurality of gateways, whether an existing connection with the selected gateway can be used to carry the subject flow; and determine whether a new connection can be established for the subject flow when the existing connection of the selected gateway cannot be used to carry the subject flow.

14. The apparatus of claim 1, wherein the one or more requirements include at least one of a maximum allowable packet error rate, a packet delay budget, and a quality of service (QoS) classification.

* * * * *